Sept. 9, 1924.

R. T. WINDLE

SIGNAL

Filed Dec. 1, 1923

R. T. Windle
INVENTOR

BY Victor J. Evans
ATTORNEY

R. A. Thomas

WITNESSES

Sept. 9, 1924.
R. T. WINDLE
SIGNAL
Filed Dec. 1, 1923
1,508,207
2 Sheets-Sheet 2
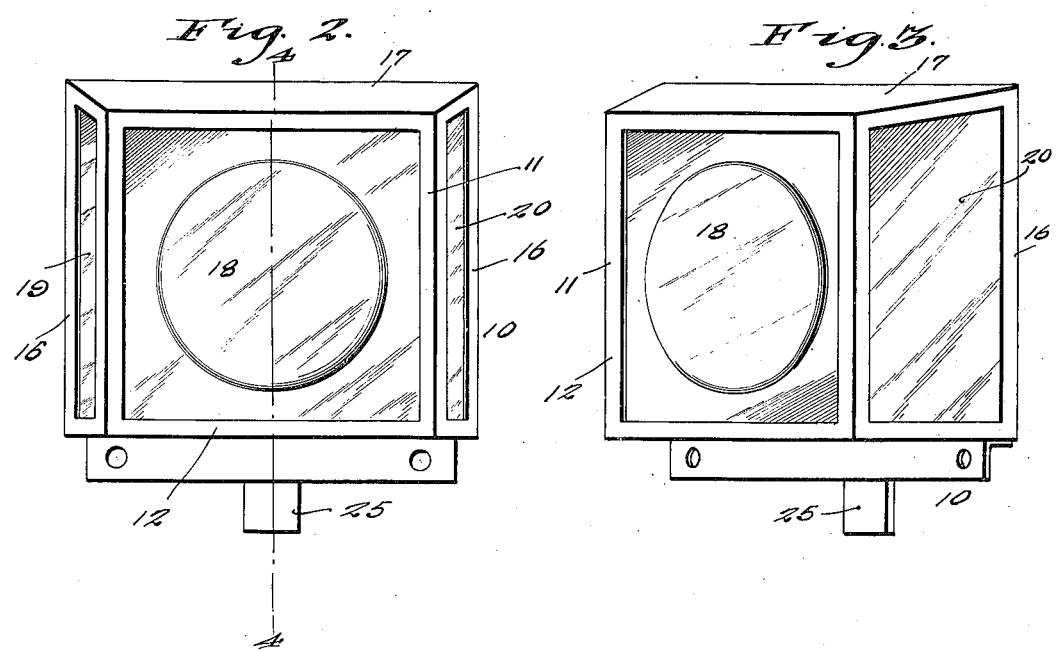
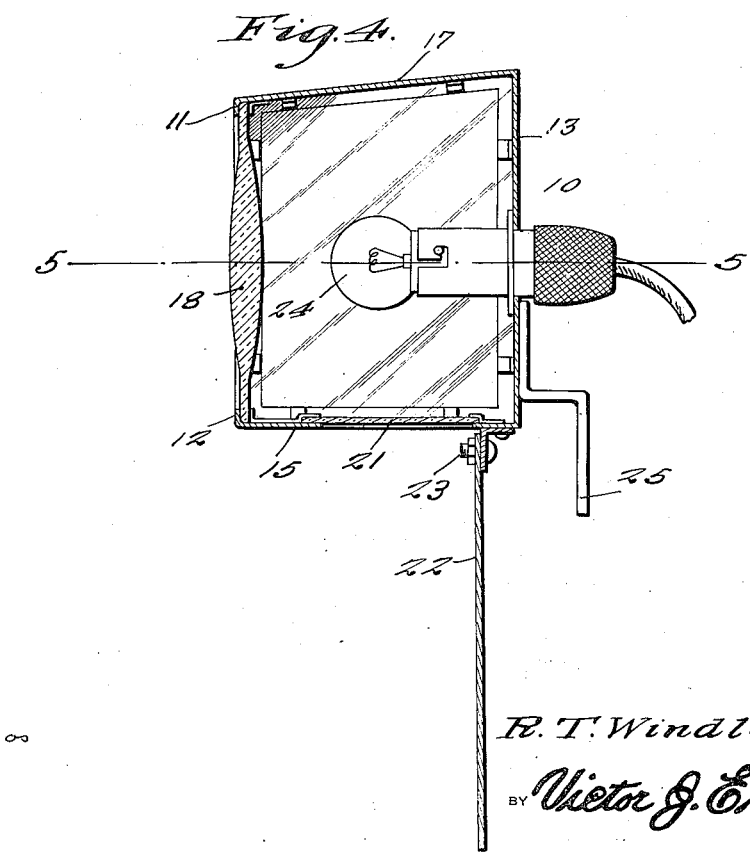
R. T. Windle
INVENTOR
BY Victor J. Evans
ATTORNEY
WITNESSES Patented Sept. 9, 1924.

1,508,207

UNITED STATES PATENT OFFICE.

RANDOLPH T. WINDLE, OF NEW YORK, N. Y.

SIGNAL.

Application filed December 1, 1923. Serial No. 678,076.

*To all whom it may concern:*

Be it known that I, RANDOLPH T. WINDLE, 140th St. and Hudson River, New York city, a citizen of United States, residing at New York city, in the county of New York and State of New York, have invented new and useful Improvements in Signals, of which the following is a specification.

This invention relates to signals and more particularly to signals for use in connection with motor driven vehicles.

The principal object of the invention is to provide a signal for attachment to the rear of an automobile to indicate to the driver of a rearwardly approaching vehicle, the direction of turn of an automobile ahead.

Another object of the invention is to provide a signal which is automatic in operation, and which does not require the use of any mechanism for operating the same, thereby permitting the driver of a vehicle to use his hands and feet for the proper steering and controlling of an automobile.

A still further object of the invention is to provide a signal in connection with a tail light, and a means for illuminating a license plate.

A still further object of the invention is to provide a signal which is simple in construction, cheap of manufacture and highly efficient for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 2 is an enlarged elevation of the same.

Figure 3 is a view showing the position of the signal when the vehicle is turning to the right.

Figure 4 is a vertical sectional view of the line 4—4 of Figure 2.

Figure 1:
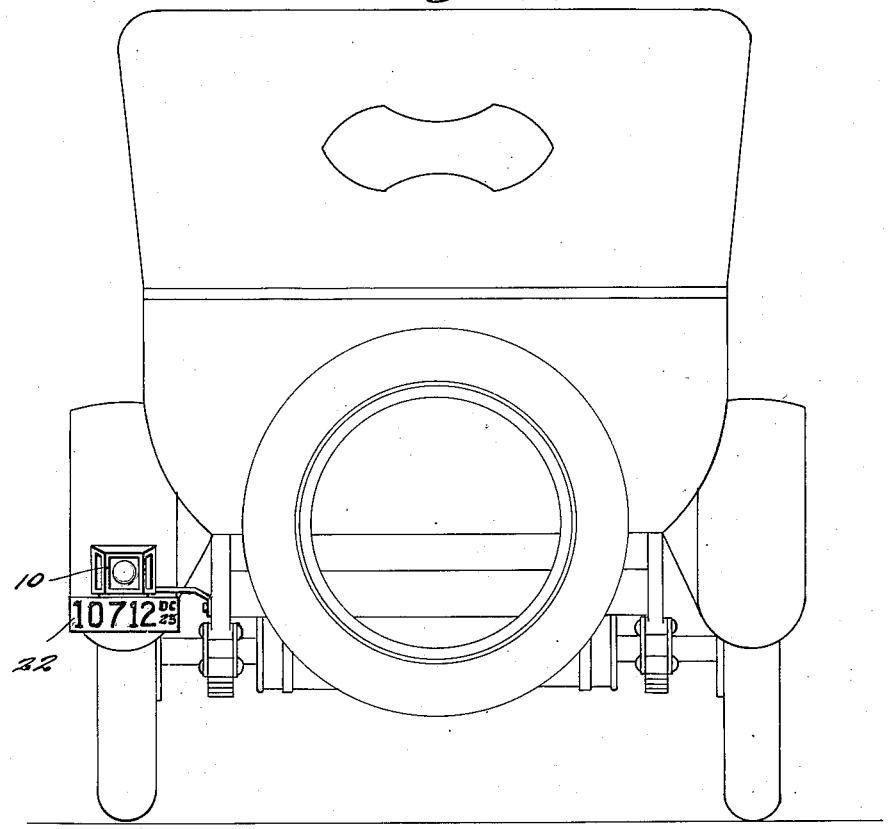
Figure 1 is a rear elevation of a portion of a motor vehicle with my invention applied thereto.
Figure 5:
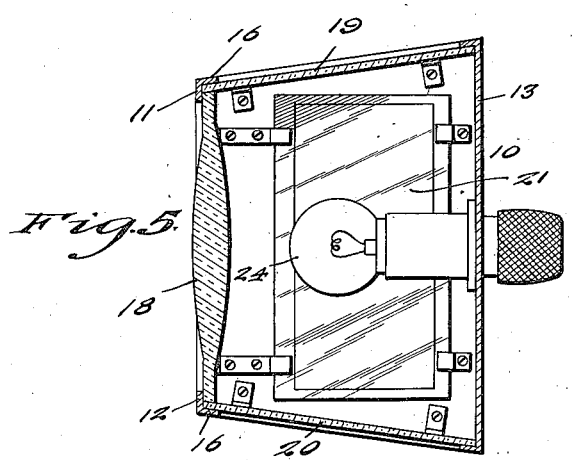
Figure 5 is a horizontal sectional view on the line 5—5 of Figure 4.

Referring more particularly to the drawing, the reference numeral 10 designates my signal in its entirety, and the same includes a lamp casing or housing 11. The housing 11 may be constructed of any suitable light material and comprises vertical front and back walls 12 and 13 respectively, a horizontal bottom wall 15 and converging side walls 16. The walls 16 converge from the back wall 13 to the front wall 12 for a purpose to be presently described. The top wall 17 is shown as converging from the rear wall to the front wall but this is not necessary as the same might be parallel with the bottom wall if desired. Mounted in the front wall 12 is a red bull's eye 18 which serves as a tail light for the vehicle. The side walls 16 have mounted therein colored glass panels 19 and 20, the left side wall panel being yellow and the opposite panel being green. These colors serve to denote left and right. These colored panels 19 and 20 serve as a signal, the operation of which will be clearly set forth hereinafter. The bottom wall 15 has mounted therein a transparent panel 21 which extends the length of the same, and mounted adjacent the panel 21 is a license plate 22. The license plate 22 may be removably secured to the casing by means of bolts 23 or in any suitable manner. Mounted in the rear wall 13 in the casing and behind the bull's eye 18, is an electric lamp 24 which receives its source of energy from the usual storage battery of an automobile which is controlled by a switch (not shown) usually positioned on the dash board. It will therefore be seen that when the lamp 24 is lighted the same will cast a red light from the front wall of the casing and yellow and green lights from the side walls of the casing. The lamp will also cause a white light to pass through the panel 21 and on to the license plate whereby to illuminate the same. The whole structure may be attached to the rear of a vehicle by means of a bracket 25 or the like.

In operation, it will be apparent that when the motor vehicle is traveling on a straightway course, that only a predetermined amount of colored light from the side walls, is visible to a machine directly behind, and that amount is equal on both sides of the tail light. This is possible by reason of the converging walls, and when the lights are visible as just mentioned, the same serve as a signal that the vehicle is traveling straight ahead. When turning to the right, the yellow light will be hidden by reason of the angle of the machine in turning and the green light will increase in size as clearly shown in Figure 3 of the drawing. When only the green light is visible to a machine behind, the same serves to indicate that the car ahead is making a turn to the right. The effect of the lights in turning to the left is just opposite to that just mentioned, as the yellow light will increase and the green light decrease until it is made invisible to a driver directly behind. It will be seen that the signals are automatic upon the turning of a vehicle which permits the driver to use his hands and feet for controlling the same.

What is claimed as new is:—

1. A signal adapted to be secured to the rear portion of a vehicle comprising a casing having front and rear walls, side walls arranged in converging relation to each other from the rear wall to the front wall, colored glass panels mounted in said side walls, a lamp mounted in said casing, a red bull's eye mounted in the front wall of said casing and adapted to serve as a tail light, a license plate suspended from said casing, and a transparent panel mounted in the bottom wall of said casing for permitting light from said lamp to be reflected on said license plate.

2. A signal comprising a casing having converging side walls, a lamp mounted therein, a yellow glass panel mounted in one of said side walls, a green glass panel mounted in the other side wall, a front wall, a bull's eye mounted in said front wall, and a bottom wall having a transparent panel therein, substantially as and for the purpose specified.

In testimony whereof I have affixed my signature.

RANDOLPH T. WINDLE.